United States Patent [19]
Bellanger et al.
[11] 3,904,963
[45] Sept. 9, 1975

[54] SYSTEM FOR THE TRANSMISSION OF ANALOG SIGNALS BY MEANS OF PULSE CODE MODULATION USING NON-RECURSIVE FILTERS

[75] Inventors: Maurice Georges Bellanger, Antony; Jacques Lucien Daguet, St. Maur, both of France

[73] Assignee: Telecommunications Radioelectriques et Telephoniques T.R.T., Paris, France

[22] Filed: Nov. 9, 1973

[21] Appl. No.: 414,375

Related U.S. Application Data

[63] Continuation of Ser. No. 262,141, June 12, 1972, abandoned, which is a continuation of Ser. No. 61,342, Aug. 5, 1970, abandoned.

[52] U.S. Cl. .......... 325/38 B
[51] Int. Cl.[2] .......... H04B 1/00
[58] Field of Search .......... 325/212, 38 B, 62; 179/15 AV, 15.55 R

[56] References Cited

UNITED STATES PATENTS

| | | | |
|---|---|---|---|
| 2,912,506 | 10/1959 | Hughes | 179/15 AV |
| 3,361,877 | 1/1968 | Kreer, Jr. | 179/15.55 R |
| 3,560,659 | 2/1971 | Greefkes | 325/42 |

*Primary Examiner*—George H. Libman
*Attorney, Agent, or Firm*—Frank R. Trifari; Simon L. Cohen

[57] ABSTRACT

A pulse code modulation system utilizes one digital filter before the digital compressor in the transmitter and a digital device which includes digital filters after the digital expander in the receiver, thereby eliminating the necessity for input and output analog filters in the transmitter and receiver, respectively.

10 Claims, 12 Drawing Figures

INVENTOR.
MAURICE G. BELLANGER
JACQUES L. DAGUET
BY
AGENT

INVENTOR.
MAURICE G. BELLANGER
JACQUES L. DAGUET
BY
AGENT

INVENTOR.
MAURICE G. BELLANGER
JACQUES L. DAGUET
BY
AGENT

INVENTOR.
MAURICE G. BELLANGER
JACQUES L. DAGUET
BY
AGENT

INVENTOR.
MAURICE G. BELLANGER
JACQUES L. DAGUET
BY
AGENT

INVENTOR.
MAURICE G. BELLANGER
JACQUES L. DAGUET
BY
AGENT

INVENTOR.
MAURICE G. BELLANGER
JACQUES L. DAGUET
BY
AGENT

SYSTEM FOR THE TRANSMISSION OF ANALOG SIGNALS BY MEANS OF PULSE CODE MODULATION USING NON-RECURSIVE FILTERS

This is a continuation of application Ser. No. 262,141 filed June 12, 1972, now abandoned, which was a continuation of application Ser. No. 61,342, filed Aug. 5, 1970, and now abandoned.

The invention relates to a system for the transmission of analog signals by means of pulse code modulation in which the analog signal at the transmitter end is converted into code groups characterizing the analog signal with the aid of a coder, which code groups are transmitted after compression in a digital compressor, and in which the transmitted code groups at the receiver end are converted into the original analog signal with the aid of a decoder after expansion in a digital expander.

In such systems, which are particularly suitable for use in time division multiplex transmission systems, it is common practice that the analog signal is applied to the coder through an input filter and that the analog signal at the output of the decoder is derived through an output filter. The requirements which these filters must satisfy are very stringent. These filters must have a very sharply defined cut-off, a slight attenuation within the passband and a very large attenuation outside the passband in order to avoid at the transmitter end that frequencies located outside the passband can return to the band, and to suppress occurring image frequencies at the receiver end. A serious drawback is that the above-mentioned stringent requirements for the filters can only be satisfied by filters which are built up from a plurality of sections provided with coils and which therefore require great care and accurate adjustment during manufacture, which makes these filters comparatively expensive. In practice these filters have the additional drawback that they are sensitive to temperature influences and ageing phenomena.

An object of the present invention is to provide a novel conception of a system of the kind described in the preamble in which the input and output filters provided with coils are entirely avoided, which novel conception makes it additionally possible to give the entire system an integrated form so that a considerable economy in cost and a greater reliability can be obtained. According to the invention the coder at the transmitter end is formed in such a manner that the code groups characterizing the analog input signal occur at a frequency which is at least four times the maximum frequency of the analog signal and which code groups consist of a certain number of bits which occur in series at the output of the coder, while a digital filter is incorporated between said coder and said compressor, which filter is formed as a low pass and half band filter of the non-recursive type so that the frequency of the code groups at the output means is half the frequency of the code groups at the input means while at the receiver end in such a system at least one digital device is incorporated between the digital expandor and the decoder, which digital device increases the frequency of the code groups applied to the filter by means of interpolation up to an output frequency which is at least an even multiple of the input frequency of the code groups.

In a preferred embodiment of the system according to the invention the digital filter used at the receiver end is formed in such a manner that the code groups appearing at the output of the device occur at a frequency which is at least four times the input frequency of the code groups, while in addition a device built up from logic elements is incorporated between the filter and the decoder, which device converts the pulse code modulation into delta pulse code modulation by subtracting successive code groups from each other.

In order that the invention may be readily carried into effect some embodiments thereof will now be described in detail by way of example with reference to the accompanying diagrammatic drawings in which FIG. 1 shows the principle diagram of the system according to the invention, FIG. 2 shows a time diagram to explain the operation of the coder used in the system according to FIG. 1,

FIG. 3 shows the two scales and their mutual relationship used in the coder, FIGS. 4*a*, 4*b* and 4*c* show the transfer characteristic of a digital filter used in the system according to FIG. 1, a number of code groups applied to the input of the filter and the inverse Fourier transformations of the filter transfer characteristic, FIG. 5 shows the principle circuit diagram of the digital filter used at the transmitter end, FIG. 6 shows the principle circuit diagram of the digital filter used at the receiver end, FIG. 7 shows a portion of the decoder used in the system according to FIG. 1,

Figure 1:
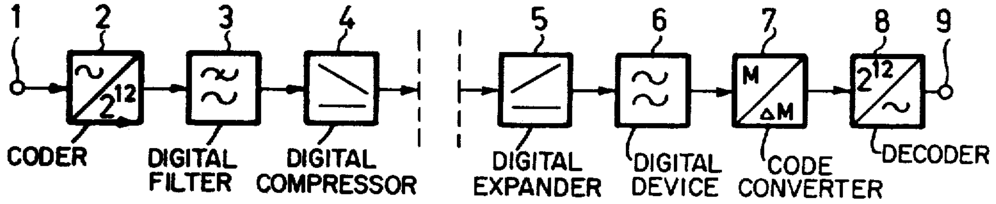

In the system for the transmission of analog signals by means of pulse code modulation as shown in FIG. 1 the part to the left of the vertical broken lines represents the transmitter. This transmitter includes a coder 2 to whose input terminal 1 the analog signal to be transmitted is applied and which coder supplies code groups which characterize the analog signal and which are transmitted after compression in a digital compressor 4 to the receiver which is shown in FIG. 1 to the right of the vertical broken lines. In this receiver the transmitted code groups are applied after expansion in a digital expandor 5 to a decoder 8 with which the original analog signal is recovered. In accordance with the invention a particularly favourable and altogether advantageous conception of such a system is obtained if the said coder 2 is formed in such a manner that the code groups characterizing the analog input signal occur at a frequency which is at least four times the maximum frequency of the analog input signal and which code groups comprise a certain number of bits which occur in series at the output of the coder and if between this coder 2 and this compressor 4 a digital filter 3 is incorporated which filter is formed as a low pass and half band filter of the non-recursive type so that the input maximum frequency is half the input maximum frequency, and if furthermore at least a digital device 6 is incorporated at the receiver end between the digital expandor 5 and the decoder 8, which digital filter increases the frequency of the code groups applied to the filter by means of interpolation up to an output frequency which is at least an even multiple of the input frequency of the code groups.

Figure 2:
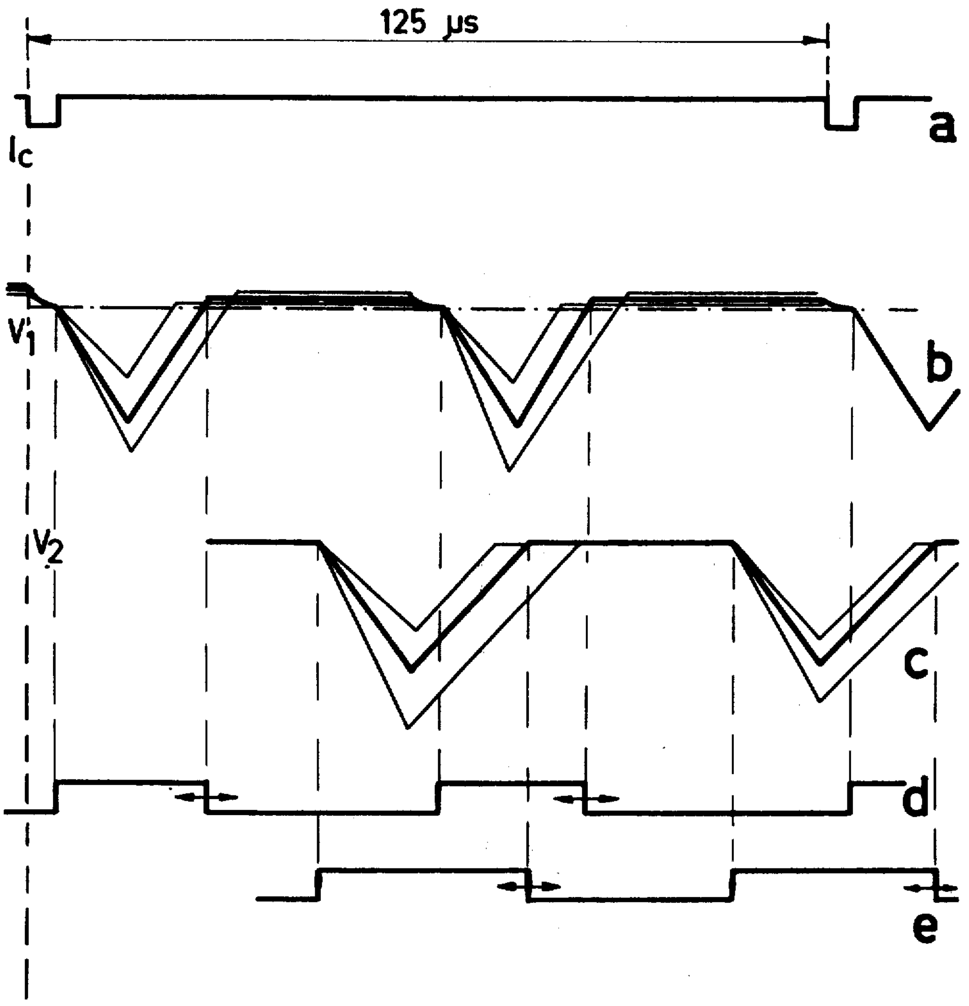

In the system shown in FIG. 1 the coder 2 is formed by a four-slope coder in which the analog signal is applied to a duration modulator which is provided with two integrating networks having mutually greatly different time constants for pulse duration modulation in accordance with four different slopes and in which the code groups are derived from a counter connected to the integrators. Such a four-slope coder is described in greater detail in U.S. Ser. No. 7,635, filed Feb. 2, 1970 now U.S. Pat. No. 3,674,931, issued July 4, 1972. In the coder described in this Patent, the third slope commences after the end of the second slope. The coder 2 used in the system according to FIG. 1 is distinguished therefrom in that the third slope in each conversion period commences at a fixed constant so that the conversion period may be better utilized. This conversion period is 125 micro seconds as is shown in the time diagram of FIG. 2*a* and starts whenever a control pulse $I_c$ occurs. FIGS. 2*b* and 2*c* show the variation of the output voltages of the first and second integrators while FIGS. 2*d* and 2*e* show the variation of the output voltages as occur at the outputs of the comparators which compare the integrator output voltages with a reference level. This reference level is shown in FIG. 2*d* for the output voltage of the first integrator by means of a chain-link line.

In this case the two integrators are each connected to counters which are active one after the other during half a period of the conversion period of 125 $\mu$ sec. In this way it is achieved that the coder supplies a code group over every half period of 62.5 $\mu$sec. which code group consists of twelve bits in series. The frequency at which these code groups occur at the output is then 16,000 per second, that is to say, four times the maximum frequency of the analog input signal. It is achieved in a very simple manner in the coder that the bits of the code groups occur in series at the output with the least important bit first. After conversion of a sample of the analog output signal the two counters of the coder together comprise the twelve bits which as a code group are representative for the amplitude of the analog signal at the instant of sampling. In order to cause these bits to occur in series at the output of the coder with the least important bit first, the two counters are temporarily modified to form shift registers so that it becomes possible to cause the bits to occur in series at a clock frequency at the outputs of these registers. During the next conversion period the counters again have their original counting function. This modification of the counters to form registers is effected with the aid of a logic control signal which acts through a number of gates on the mutual connections between the bistable elements of the counters. When these devices are active as a counter the clock signal is only applied to the first bistable element of the counter which has the smallest weight and the Q output of each bistable element is connected to the input of the next bistable element to which the clock signal is applied. The inputs J and K of the bistable elements then have a fixed polarity. During the conversion period this device operates as a counter. Subsequently, at the end of the conversion period, the clock signal is suppressed and the counter has a certain counting content. The clock signal is then applied to the clock pulse inputs of all bistable elements as a result of the control pulse and with the interposition of the previously mentioned gates and the outputs Q and $\overline{Q}$ of each bistable elements are connected to the inputs J and K, respectively, of the first bistable element (smallest weight). It will be evident that the counters are modified into shift registers in this manner. The bits originally present in the counters will thus occur in series and the smallest weight first at the output Q of the first bistable element (smaller weight) during the period of duration of the control pulse.

Figure 3:
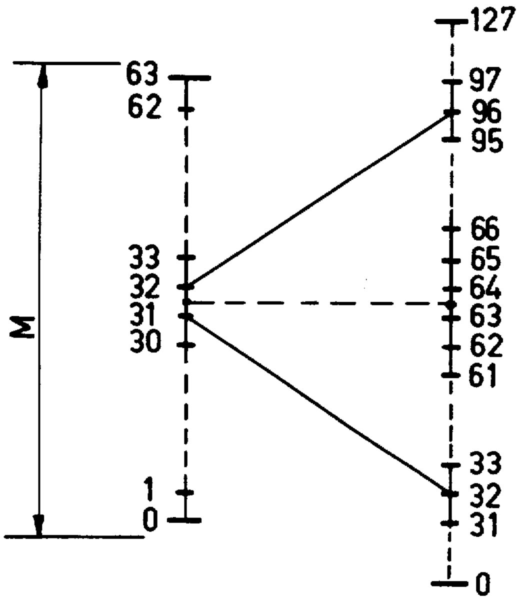

The coder 2 used in this system is additionally distinguished by the division of the scales and the centring of the zero position. This four-slope coder produces the analog-to-digital conversion by means of twelve bits in two successive stages employing two scales which are shown in FIG. 3. The first scale has 64 steps of great weight for the first six bits; and the other scale has 128 steps of small weight. 64 steps of the second scale precisely fit in one step of the large scale which is diagrammatically shown by the two oblique lines shown in FIG. 3. Since the second scale has 128 steps, it may easily be varied relative to the first scale when it is influenced, for example, by temperature without this exerting influence on the signal-to-noise ratio because always only 64 small steps correspond to one big step.

FIG. 3 shows that the zero position corresponding to an analog signal 0 and chosen for the coder, which position is shown by the broken-line of intersection and the two scales, is located on the first scale between the 31st and 32nd steps and between the 63rd and 64th steps on the second scale. The steps covered on this second scale range from 32 to 96. In this zero position the coder supplies the code group 011111111111 = 2047 (centre of a scale of 4096 steps enumerated 0 to 4095). This means that the coder determines the sum of $31 \times 64 + 63 = 2047$.

On the other hand the steps of the second scale located about the zero position (in the vicinity of 63) are covered when a weak signal is applied to the input of the coder. The first scale will always give the same indication as long as the input signal applied to the coder has a value measured from peak to peak which does not exceed 64 small steps. Since 64 small steps together have the value of one big step, that is to say, they correspond to 1/64 part of the value which may be applied as a maximum to the input of the coder without saturation occurring, the ratio 1/64 exactly defines the limit of the segment which includes the origin in case of a normal digital compressor of 13 segments. Non-linearity phenomena may occur at the transition of the two scales, that is to say, when one step upwards or downwards is effected on the first scale as a result of the fact that all possible steps in one or the other direction on the second scale have been covered.

By using the steps 32 to 96 on the second scale and adjusting the zero position in the centre of the second scale (that is to say, the centre of the segment of the compression characteristic passing through the origin) a coder may be obtained which is purely linear for weak signals. The non-linearity phenomena only occur when a segment is changed, which is less unfavourable for the signal-to-noise ratio.

As explained in the foregoing 12 bits of code groups occur at the output of the coder at a frequency which is at least four times the maximum frequency of the analog input signal, that is to say, the code groups occur at a frequency of 16,000 per second when this maximum frequency is 4 kHz. The clock frequency is 2048 kHz.

The 12 bits of code groups are transformed with the aid of a very simple device (not shown) by means of zero additions into 16-bit code groups, the transformation consisting of, for example, the addition of at least two zeros at the commencement and the end of the code word of twelve bits.

The digital filter which is denoted by the reference numeral 3 in FIG. 1 is of the type without a feedback circuit and is therefore very stable. As described, the code groups applied to this filter comprise 16 bits in series only 12 bits of which have any significance. The other four bits serve as an addition so as to achieve a format of sixteen bits so that it becomes possible to use dynamic memories in the filter. The use of this type of memory has the special advantage that four phase logics may be used as is known, for example, from an article in "Mullard Technical Communications", May 1969, pages 266–276 and whose circuits are particularly suitable for large-scale integration.

As is known a dynamic memory consists of a shift register the output of which may be fed back to the input by a control signal so that when a piece of information consisting of a series of $n$ bits is completely written in in the register and when subsequently the output is fed back to the input by a control signal occurring at that instant, this piece of information starts to circulate in the register under the control of clock pulses until the said control signal is interrupted. Thus the register operates as a memory. The contents of the register then accurately correspond periodically every time after $n$ clock pulses or a multiple of $n$ to the original information which is written in and which can consequently be read out periodically.

When using these registers in the filter the code groups to be written in in the register occur one after the other at a frequency of 16,000 per second, that is to say, at a time interval which is equal to 128 clock pulse intervals (clock pulse frequency 2048 kHz). For a correct use of these registers it is required that the number of $n$ bits of these code groups is a full submultiple of 128. This is the case when $n = 16$ and not when $n = 12$.

Figure 4A:
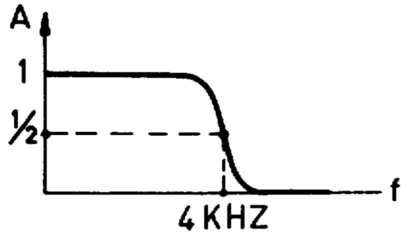

FIG. 4*a* shows in the amplitude-frequency sector the filter transfer characteristic of the low-pass filter to be obtained. The cut-off frequency of this filter is at 4,000 Hz corresponding to the maximum frequency of the analog signal to be transmitted.

Figure 4B:
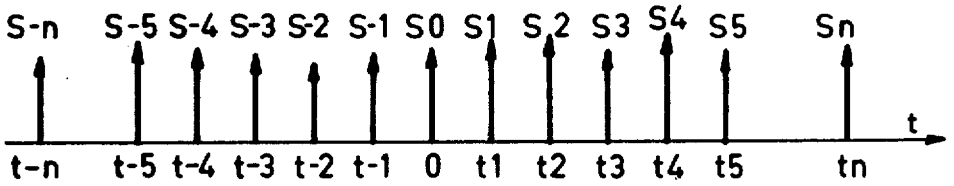

FIG. 4*b* shows in the amplitude-time sector the successive PCM signals which are applied to the filter and which occur at a frequency of 16,000 per second, thus at a period $t = 62.5$ μsec. These PCM signals have the following values:

$S_0$ at the instant $t_0 = 0$ $S_1, S_2, S_3 \ldots S_n$ at the instants $t_1 = T$, $t_2 = 2T$, $t_3 = 3T \ldots t_n = nT$ $S_{-1}, S_{-2}, S_{-3} \ldots S_{-n}$ at the instants $t_{-1} = -T$, $t_{-2} = -2T$, $t_{-3} = -3T, \ldots\ldots,$ $t_{-n} = -nT$.

Figure 4C:
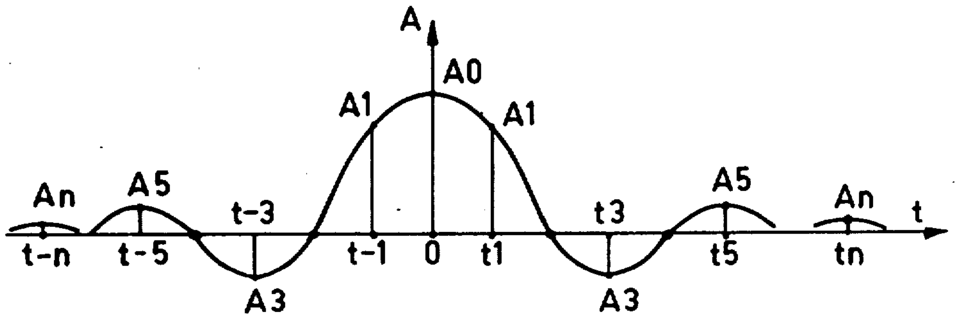

FIG. 4*c* shows in the amplitude-time sector and at the same time scale as in FIG. 4*b* the inverse Fourier transformation of the filter transfer characteristic of the filter to be obtained. At the instants corresponding to those of the PCM signals shown in FIG. 4*b* this inverse Fourier transformation is defined by the coefficients:

$A_0$ at the instant $t = 0$ $A_1, A_3, A_5 \ldots A_n$ at the instants $t_1$ and $t_{-1}$, $t_3$ and $t_{-3}$, $t_5$ and $t_{-5} \ldots$ $t_n$ and $t_{-n}$ $n$ = odd number.

It may be noted that at the instants $t_n = nT$ and $t_{-n} = -nT$ the coefficients have the value of zero when $n$ = even and differs from 0.

It is known per se (see, for example, the handbook "System Analysis by Digital Computer" by F. F. Kuo and J. K. Kaiser, chapter 7) that a non-recursive filter having a transfer characteristic defined by the inverse Fourier transformation may be obtained by the following elaboration of the code groups applied to the input of the filter:

$$\phi = \sum_{n=0}^{n=\infty} A_n(S_n + S_{-n})$$

in which $A_n$ is representative for the coefficients of the inverse Fourier transformation at the instants when the code groups $S_n$ and $S_{-n}$ occur. The result $\phi$ of this elaboration is the filtered code group taking into account the input code groups $S_n \ldots S_3, S_2, S_1, S_0, S_{-1}, S_{-2}, S_{-3} \ldots S_{-n}$.

It may be noted with reference to FIG. 4*c* that the coefficients $A_n$ are equal to 0 for the even values of $n$ with the exception of $n = 0$ where $A_n$ assumes the value $A_0$.

The elaboration to be performed thus is:

$$\sum_{n=1}^{\infty} A_n (S_n + S_{-n})$$

for $n$ = odd.

When a certain variation of the passband of the filter and a non-finite sharply defined cut-off is admitted, the number of coefficients $A_n$ used for the calculation of $\phi_k$ becomes finite.

When, for example, three coefficients $A_1$, $A_3$, $A_5$ are taken the calculation to be performed for the filter will be equal to the finite sum:

$$A_5S_5 + A_3S_3 + A_1S_1 + A_0S_0 + A_1S_{-1} + A_3S_{-3} + A_5S_{-5}.$$

Figure 5:
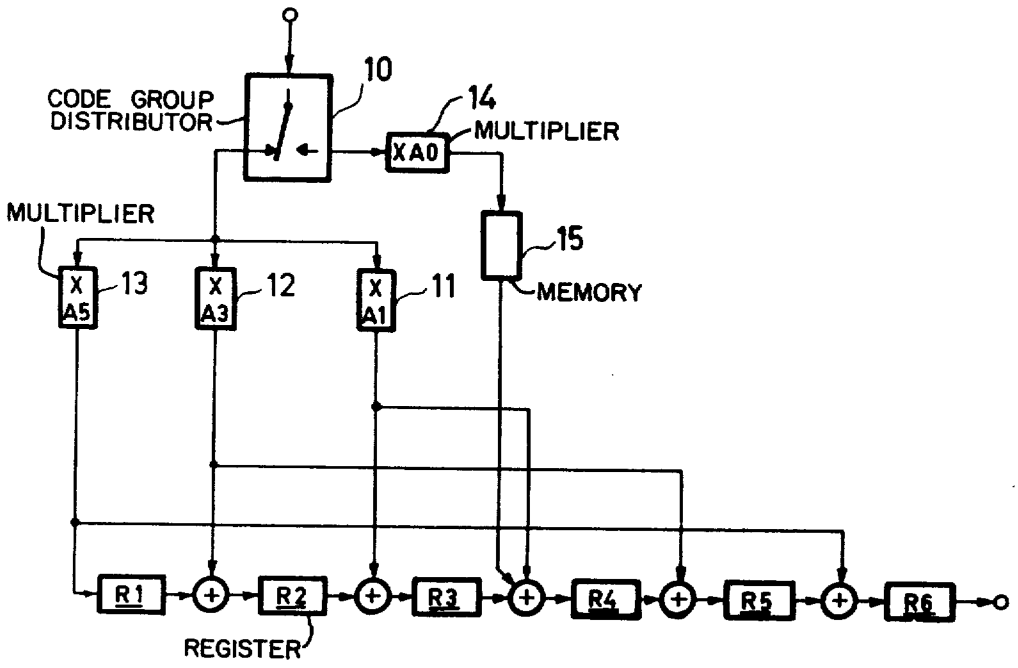

FIG. 5 shows the filter 3 according to the invention in a block diagram and formed as the case taken as an Example in which three coefficients $A_1$, $A_3$, $A_5$ are used. The bits of the code groups consisting of 16 bits appear in series at the input of the filter 3. A known device 10 refers the code groups of odd serial number to the multipliers 11, 12, 13 which multiply these code groups simultaneously by the coefficients $A_1$, $A_3$, $A_5$, respectively. The code groups of even serial number are referred to multiplier 14 which multiplies these code groups by the coefficient $A_0$. The result of the multiplication of the code groups of even serial number is stored in a memory 15 and will be used after the odd code groups following this even code group have also been multiplied by $A_1$, $A_3$, $A_5$. Furthermore, the filter includes six registers R1, R2, R3, R4, R5, R6 and five combination devices *m*1, *m*2, *m*3, *m*4, *m*5. An input of the combination device m1 is connected to the output of the register R1 and the output of *m*1 is connected to the input of R2. The combination devices *m*2, *m*3, *m*4, *m*5 are connected in the same way between respectively the register (R2, R3), (R3, R4), (R4, R5), (R5, R6). The output of the multiplier 13 is connected to the input of the register R1 and to an input of the device m5. The output of the multiplier 12 is connected to an input of the combination devices *m*1 and *m*4. The output of multiplier 11 is connected to an input of the combination devices *m*2 and *m*3. Furthermore, the output of the memory 15 is connected to a third input of the combination device *m*3. In this way, each time an odd code group occurs to the input of the filter, this code groups is multiplied by A1 A3 A5 by means of multipliers 11, 12, 13 and after these multiplications the contents of the registers are simultaneously changed as mentioned below:

— the result of the multiplication by $A_5$ is stored in $R_1$

— the contents of $R_1$ are combined with the result of the multiplication by $A_3$ and are stored in $R_2$.
— the contents of $R_2$ are combined with the result of the multiplication by $A_1$ and are stored in $R_3$.
— the contents of $R_3$ are combined with the result of the multiplication by $A_1$ and with the result of the multiplication by $A_0$ which is present in the memory 15; the result of this combination is stored in $R_4$.
— the contents of $R_4$ are combined with the result of the multiplication by $A_3$ and are stored in $R_5$.
— the contents of $R_5$ are combined with the result of the multiplication by $A_5$ and are stored in $R_6$.
— the contents of $R_6$ leave the filter so as to be further handled by the compressor 4 of FIG. 1.

The successive stages of operation which are performed in the filter will be explained hereinafter while assuming for the sake of clarity that the following code groups occurring in the given sequence are concerned: $S_5, S_4, \ldots\ldots S_0 \ldots\ldots\ldots S_{-4}, S_{-5}$ which occur at the input of the filter with the code group $S_5$ first.

Furthermore it has been assumed that the registers $R_1$ to $R_6$ and the memory 15 are empty at the instant $t_5$ when the code groups $R_5$ comes in. The following elaboration proves that a digital number is obtained at the instant $t_5$ in the register $R_6$, which number is equal to the value $\phi_E$ mentioned in the foregoing.

— At the instant $t_5$: the multiplication of $S_5$ by $A_1$, $A_3$, $A_5$ is effected whereafter the result of these multiplications is directly written in in the registers $R_1$, $R_2$, $R_3$, $R_4$, $R_5$, $R_6$. It is necessary to note only the digital value which is written in the register $R_1$, because at the instant $t_{-5}$ it will be the only value present in the output register $R_6$. The contents of register $R_1$ are $S_5A_5$.
— At the instant $t_4$: the multiplication of $S_4$ by $A_0$ is effected. The product $S_4A_0$ is written in in the memory 15 and will be used for the next elaboration. The contents of the registers are unchanged.
— At the instant $t_3$: the multiplication of $S_3$ by $A_1$, $A_3$, $A_5$ and combination of the products $S_3A_1$, $S_3A_3$, $S_3A_5$ with the contents of the registers is effected in the manner as described in the foregoing. It is necessary to note only the contents of the register $R_5$ after this instant $t_{-3}$ because this is the only value which will be present at the instant $t_{-5}$ in the register $R_6$. These contents of $R_2$ are $S_5A_5 + S_3A_3$.

— At the instant $t_2$: $S_2A_0$ is written in in the memory 15.
— At the instant $t_1$: the contents of $R_3$ are present in the output register $R_6$ which contents are equal to: $(S_5A_5 + S_3A_3) + S_1A_1$.
— At the instant 0: $S_0A_0$ is written in in the memory 15.
— At the instant $t_{-1}$: the contents of register $R_6$ correspond to the contents of register $R_4$ which are equal to the sum of three values: the contents of $R_3$: $S_5A_5 + S_3A_3 + S_1A_1$, the product $S_0A_0$, the product $S_{-1}A_1$. After the instant $t_{-1}$ the contents of $R_4$ thus are: $S_5A_5 + S_3A_3 + S_1A_1 + S_0A_0 + S_{-1}A_1$.
— At the instant $t_{-3}$ the contents of $R_5$ are: $S_5A_5 + S_3A_3 + S_1A_1 + S_0A_0 + S_{-1}A_1 + S_{-3}A_3$.
— At the instant $t_{-5}$ the contents of $R_6$ are: $S_5A_5 + S_3A_3 + S_1A_1 + S_0A_0 + S_{-1}A_1 + S_{-3}A_3 + S_{-5}A_5$, that is to say, the desired value $\phi_E$. The value $\phi_E$ occurs at the output of the filter at a frequency which is equal to the rhytum by which the odd code groups occur at the input of the filter, hence at a frequency of 8,000 per second.

During the time intervals when the registers $R_1$ to $R_6$ are not written in or read out these registers keep their contents by functioning as a dynamic memory. The memory 15 is likewise constituted by a dynamic memory. The multipliers of the filter are likewise constituted by such registers and by combination devices which may be formed in known manner by an assembly of gates. Thus it can be stated that the filter consists of registers and gates which, as is known, are suitable for large-scale integration. The digital filter which is used at the receiver end according to the invention is formed in a corresponding manner and is therefore likewise suitable for large-scale integration. This filter which is denoted by the reference numeral 6 in FIG. 1 receives code groups of 16 bits each in series from the expandor 5 at a frequency of 8,000 per second, that is to say, at a duration per code group of 125 μsec.

Figure 6:
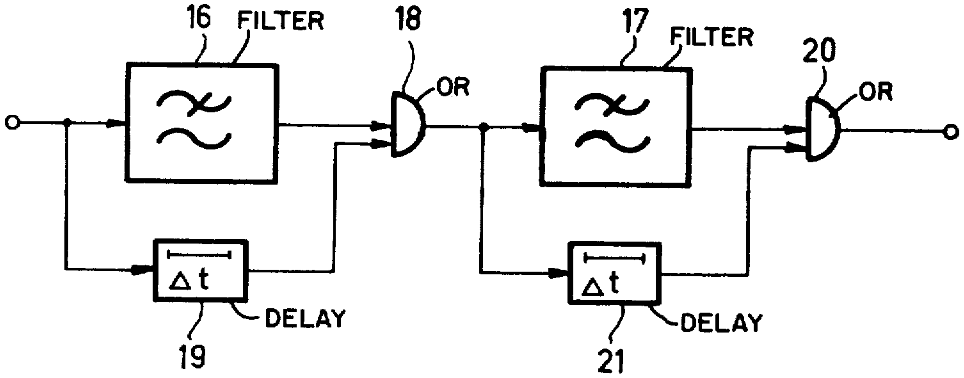

FIG. 6 shows a block diagram of the digital device 6 used at the receiver end. This device 6 comprises two units 16 and 17. The filter 16 provides the filtered code groups at a frequency which corresponds to the rhythm in which these code groups are applied to the input, that is to say, a frequency of 8,000 per second, which code groups appearing at the output constitute a value which is interpolated in a point located at a mutually equal distance between the successive code groups applied to the filter. The output of this filter $F_1$ is connected to an OR gate 18 while the input of this filter is likewise connected through a delay circuit 19 to this OR gate 18 with the aid of which the code groups occurring at the output of the delay circuit 19 are inserted between the code groups occurring at the output of the filter 16 so that code groups at a frequency of 16,000, that is to say, at a duration of 62.5 μsec per code group occur at the output of the OR gate 18.

The filter 17 connected to the OR gate operates in the same manner as the filter 16 but with double the number of the code groups applied to the input. This filter provides the code groups at a frequency of 16,000, which code groups constitute an interpolated value in a point which is located at a mutually equal distance from two successive code groups applied to the input. Finally code groups which occur at a frequency of 32,000 with a duration of 31.25 μ sec per code group are obtained at the output of OR gate 20 with the aid of OR gate 20 and delay circuit 21. These code groups are formed by code groups applied to the input of the device 6 and code groups which are interpolated in three points located at mutually equal distances between two successive code groups applied to the input of the device 6.

The filtering process of obtaining code groups which are interpolated in a point which is located at mutually equal distances from two successive code groups applied to the input of the filter 16 will be described hereinafter. This process largely corresponds to that of the filter which is used at the transmitter end. The transfer characteristic of the filter is defined by its inverse Fourier transformation as is illustrated by the curve in FIG. 4c. This curve is defined by the coefficients $A_0$, $A_1$, $A_3$, $A_5$.

The filter 16 is, however, distinguished from the filter used at the transmitter end to which the code groups are applied at a frequency of 16,000 per second and which code groups are on the one hand of an odd order such as . . . . . , $S_5$, $S_3$, $S_1$, $S_{-1}$, $S_{-3}$, $S_{-5}$ . . . . . . , and on the other hand of an even order such as . . . . , $S_4$, $S_2$, $S_0$, $S_{-2}$, $S_{-4}$ . . . . . . , namely in that the filter 16 receives the code groups at a frequency of 8,000 per second, that is to say, exclusively code groups which are of an odd order such as $S_5$, $S_3$, $S_1$, $S_{-1}$, $S_{-3}$, $S_{-5}$ whose instants of occurrence are shown in FIG. 4b. It follows that the function to be realized by the filter 16 which, according to the handbook by Kuo and Kaiser mentioned in the foregoing, have the general form:

$$\phi = \sum_{n=0}^{n=\infty} A_n(S_n + S_{-n})$$

which in the case of three coefficients $A_1$, $A_3$, $A_5$ becomes equal to:

$$\phi_R = S_5A_5 + S_3A_3 + S_1A_1 + S_{-1}A_1 + S_{-3}A_3 + S_{-5}A_5.$$

The term $A_0S_0$ which occurred in the filter used at the transmitter end has disappeared in this case because $S_0 = 0$.

The device used for obtaining the filter 16 largely corresponds to the device used for the filter at the transmitter end and shown in FIG. 5. The device of the filter 16 is, however, different in that neither the device 10 for separating the code groups of even and odd order is used, nor the multiplier 14 and the memory 15 connected thereto.

As regards operation of the filter 16 the process starts every time at the instants when code groups occur at the input, which process has already described hereinbefore for the filter used at the transmitter end, that is to say, the multiplication of the code groups applied to the input by the coefficients $A_1$, $A_3$, $A_5$ and writing in the results of these multiplications in the registers added to the contents of each previous register. If only six successive code groups $S_5$, $S_3$, $S_1$, $S_{-1}$, $S_{-3}$, $S_{-5}$ applied to the input of the filter are considered, the calculation will commence at the instant $t_5$ and the desired result $\phi_R$ will be after the instant $t_{-5}$ in the register $R_6$. This code group of the value $\phi_R$ is representative for a code group interpolated at the instant $t = 0$ which as regards time is located at an equal distance from the instants $t_1$ and $t_{-1}$, the interpolation being performed while taking into account the code groups $S_5$, $S_3$, $S_1$ passed and the code groups $S_{-1}$, $S_{-3}$, $S_{-5}$ which are still to come after the instant $t_0$. It will be evident that the code group $\phi_R$ cannot be obtained earlier than after the instant $t_{-5}$ when the code group $S_{-5}$ is applied to the filter. The code groups $\phi_R$ occur at the output of the filter 16 at a frequency of 8,000 per second and have a duration of 62.5 μ sec each which corresponds to half the duration of a code group applied to the input of the filter.

In order to insert the code groups of the value $\phi_R$ occurring at the output of the filter 16 between the code groups applied to the input of the filter, the period should be taken into account which is necessary for performing the calculation of these code groups $\phi_R$. When in conformity with the embodiment $\phi_R$ is representative for the code group interpolated at the instant $t = 0$, the value $\phi_R$ will not occur at the output of the filter until half a period after the instant $t_{-5}$, hence at a delay of three times the duration of a code group applied to the input of the filter (375 μ sec). The delay circuit 19 serves to introduce this delay and makes it therefore possible to insert the code groups occuring at the input of the filter at the correct instants between the code groups occuring at the output of the filter.

The filter 17 of FIG. 6 performs the same operations as the filter 16; this filter is formed in the same manner, the coefficients of the inverse Fourier transformation of this filter 17 are determined starting from the transfer characteristic of the entire filter (16 and 17) used at the receiver end. The filter 17 provides 16,000 code groups per second which after the insertion of the code groups applied to the input of the filter results in a succession of 32,000 code groups per second.

It will be evident that the device 6 used at the receiver end is readily suitable for large-scale integration because this filter is built up from two filters 16 and 17 which are each formed in the same manner as the filter used at the transmitter end.

The decoder 8 of FIG. 1 of the embodiment described of the system according to the invention is a decoder of the type which reacts to pulse density variations. This type of decoder has the advantage that it is suitable for large-scale integration except for the analog part which is formed in this case by a single integrator operating with two time constants and providing the original analog signal. In addition this decoder has the advantage that it operates at the same standardised frequency as the coder, namely a clock frequency of 2048 kHz.

The code groups applied to the input of the decoder are provided in the embodiment shown by a device 7 of FIG. 1 which converts the pulse code modulation into delta pulse code modulation by subtracting successive code groups from each other. These are code groups which occur at a frequency of 32,000 per second and which are formed by twelve bits in series one of which indicates the sign.

The six bits of small weight and the six bits of large weight of each applied code group are simultaneously converted into two independent density-modulated pulse trains in the digital part of the decoder.

Figure 7:
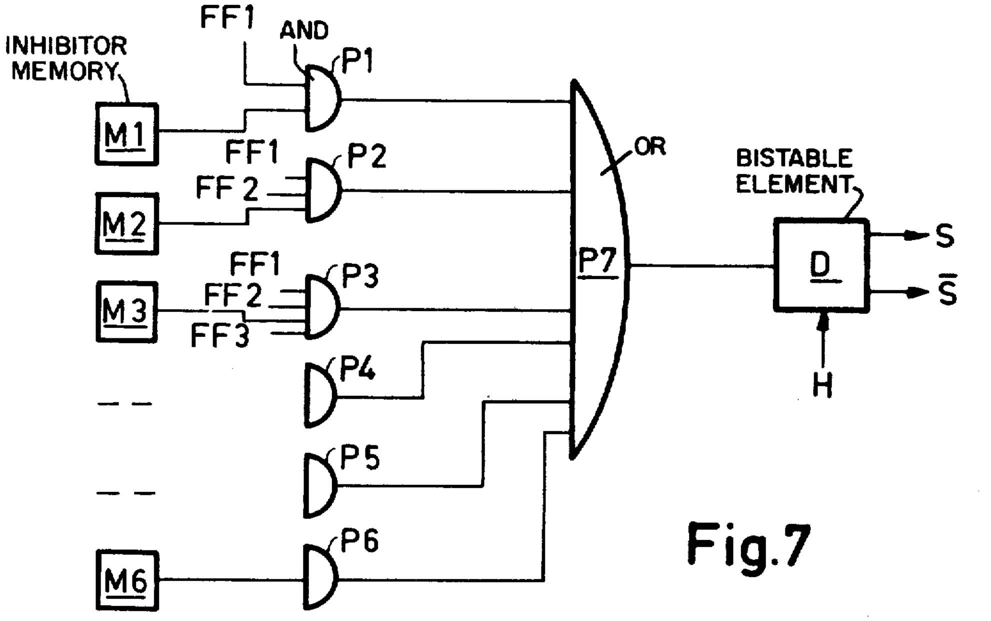

FIG. 7 shows a block diagram of the device used for converting one of the two groups of six bits in a density-modulated pulse train. This device includes six inhibitor memories $M_1$, $M_2$, $M_3$, $M_4$, $M_5$, $M_6$ each of which can store a bit, six AND gates indicated by $P_1$, $P_2$, $P_3$, . . . . . . $P_6$, an OR gate $P_7$ and finally a bistable element D which provides the pulse train S and its complement $\bar{S}$ for controlling the integrator operating with two time constants.

Figure 8:
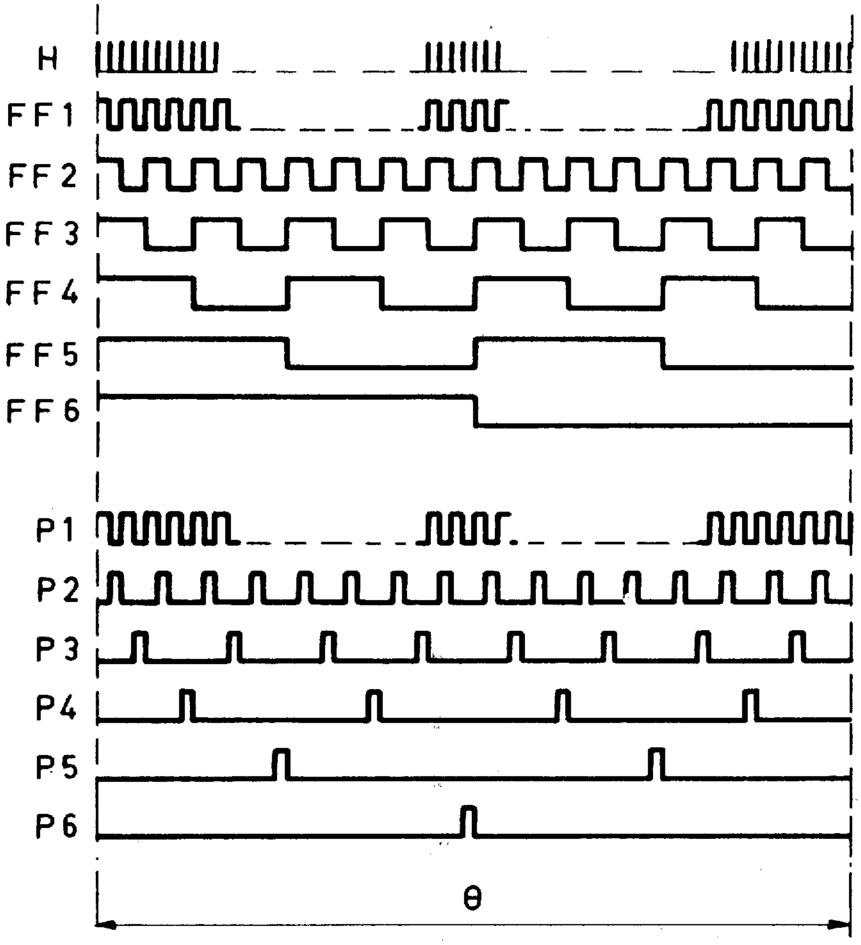
FIG. 8 shows a time diagram to explain the operation of the decoder shown in FIG. 7.

The signals denoted by $FF_1$, $FF_2$, $FF_3$, . . . . . . . . . , $FF_6$ in FIG. 8 are applied to the said AND gates $P_1$ to $P_6$, which signals are generated with the aid of a digital counter (not shown) comprising six bistable elements to the first element of which the clock-pulse of a frequency of 2048 kHz and indicated by H in FIG. 8 are applied. The AND gates $P_1$ to $P_6$ are controlled by these signals in such a manner that they perform the following logic elaborations: $P_1 = FF_1$; $P_2 = \overline{FF_1} \cdot FF_2$; $P_3 = \overline{FF_1} \cdot \overline{FF_2} \cdot FF_3$; $P_4 = \overline{FF_1} \cdot \overline{FF_2} \cdot \overline{FF_3} \cdot FF_4$; $P_5 = \overline{FF_1} \cdot \overline{FF_2} \cdot \overline{FF_3} \cdot \overline{FF_4} \cdot FF_5$; $P_6 = \overline{FF_1} \cdot \overline{FF_2} \cdot \overline{FF_3} \cdot \overline{FF_4} \cdot \overline{FF_5} \cdot FF_6$.

In FIG. 8 the signals occurring as a result of said logic elaboration at the output of the respective AND gates are denoted by $P_1$, $P_2$, $P_3$ . . . . . $P_6$. These signals, which during the period $\phi$ which comprises 64 clock pulse periods, that is 31.75 $\mu$ sec, are then given the weights 32-16-8-4-2-1.

The signals $P_1$, $P_2$, $P_3$ . . . . . $P_6$ only occur at the output of the AND gates $P_1$ to $P_6$ when these do not receive an inhibitor signal from the inhibitor memories $M_1$, $M_2$, $M_3$ . . . $M_6$ connected to the respective inputs of the AND gates $P_1$ to $P_6$.

It will be readily evident from FIGS. 7 and 8 that when the six bits which are written in in the inhibitor memories $M_1$, $M_2$, $M_3$ . . . . . $M_6$ occur in the rhythm of $(1/\theta)$ which is the rhythm in which the code groups are applied to the decoder and occur at the respective inputs of the AND gates $P_1$ to $P_6$, a pulse train occurs at the output of the OR gate $P_7$ whose total duration during the period $\theta$ is representative for the value of the group to be decoded and consisting of six bits.

The pulses of this pulse train are symmetrically distributed over the period $\theta$ relative to the centre of the period. The bistable element D which is controlled at the clock frequency of 2048 kHz causes the phase of the pulses occurring at the output of the OR gates $P_7$ to be restored and provides the signals S and $\overline{S}$ which are applied to the integrator.

The device shown in FIG. 7 converts, for example, the six bits of small weight into duration. The conversion of the group of six bits of large weight is effected simultaneously with the aid of a device formed in the same manner. In that case the same counter built up of six bistable elements is used for these two devices so that finally two independent density-modulated pulse trains $S_1$ for the six bits of small weight and $S_2$ for the six bits of large weight are obtained.

It has already been noted in the foregoing that the device 7 of FIG. 1 which converts the pulse code modulation into delta pulse code modulation by subtracting the successive code groups from each other provides code groups consisting of twelve bits one bit of which indicates the sign. After the conversion into duration described hereinbefore, these code groups are converted into their absolute values by addition of the binary number 100000100000 so that the zero adjustment of the decoder (input signal 0) is in the centre of the linear region likewise as in the coder.

The decoder is linear only when the device which converts the six bits of small weight is active. For weak signals whose peak-to-peak amplitude is not larger than the sum of the six bits of small weight the conversion into duration is thus linear.

Figure 9:
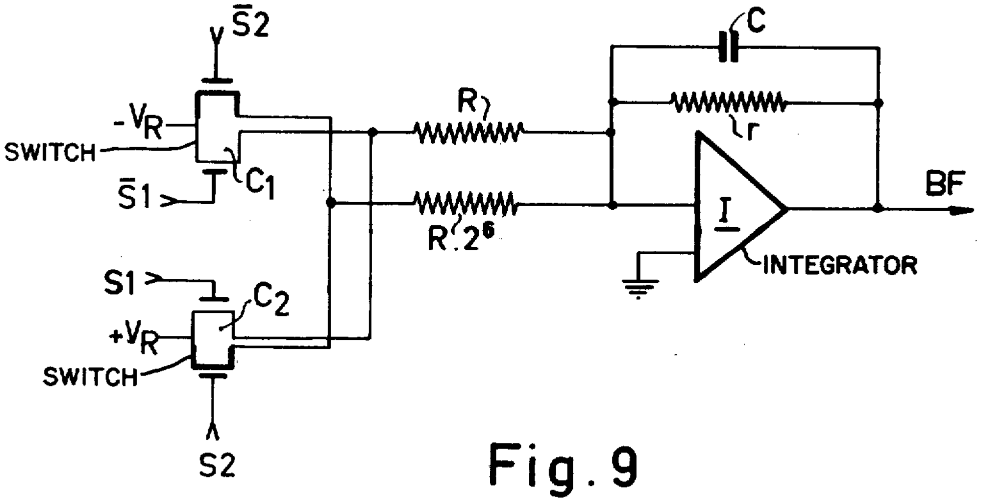
FIG. 9 shows an embodiment of an integrator having double time constants used in the decoder and FIG. 10 shows for the purpose of illustration the analog output signals supplied by the integrator according to FIG. 9.

As FIG. 9 shows the signals $S_1$ and $S_2$ and their complements $\overline{S}_1$ and $\overline{S}_2$ are applied to switches $C_1$ and $C_2$ which as a function of these signals apply either the voltage $-V_R$ or the voltage $+V_R$ to the input of the integrator employing two time constants.

Figure 10:
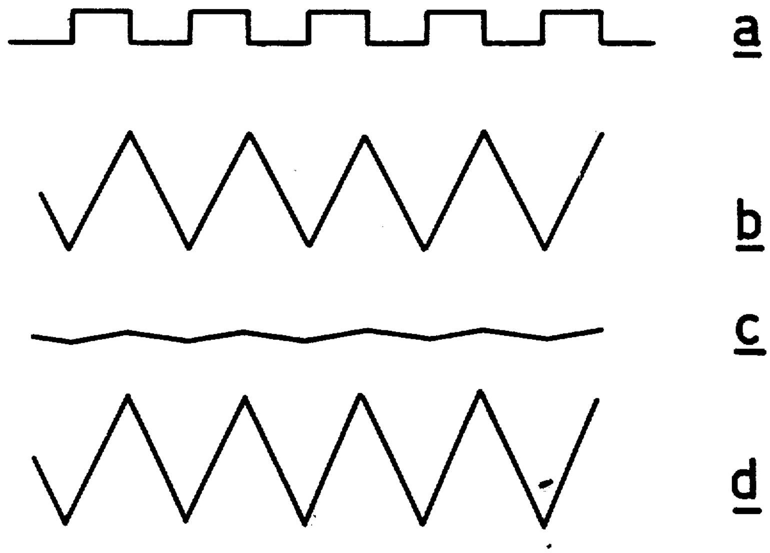

FIG. 10 shows the diagrams of the signals which occur at the output of the integrator when a signal of zero amplitude is applied to the input of the decoder. Diagram *a* shows the signal which occurs at the output of the OR gates associated with the bits of large weight and those associated with the bits of small weight. Diagram *b* shows the signal which occurs at the output of the integrator as a result of the bits of large weight. Diagram *c* shows the output signal which occurs as a result of the bits of small weight (amplitude H/64 in which *H* = peak-to-peak amplitude). Diagram *d* shows the sum of these signals, and this signal has a constant mean value during an interval of 31.25 $\mu$ sec; this mean value is brought to zero by adjustment of the value of the voltage $+V_R$ in relation to $-V_R$. The voltage $+V_R$ follows the voltage $-V_R$ by the interposition of an operational amplifier and a resistance bridge which makes it possible to adjust the values of $+V_R$ in such a manner that the output voltage of the integrator assumes a mean value of 0 volt in the absence of a signal at the input of the decoder. In this way the switching phenomena and the bias voltage of the operational amplifier are compensated. The integrator is provided with a capacitor C which is shunted by a resistor *r* which automatically stabilizes the mean value of the low-frequency output signal of the integrator.

The system according to the invention has the advantage that the common input and output filters can be omitted except for one RC network and that the system as a whole is suitable for large-scale integration. The described embodiment has the additional advantage that the technology which is most advantageous in this respect may be used, that is to say, the technology employing so-called four-phase logics which is suitable for field effect transistors and separate gates and in which only a minimum number of outputs is necessary because the bits of each code group are applied in series which is of special advantage because the realization of outputs as such is difficult and therefore has a cost-increasing effect.

What is claimed is:

1. A system for the transmission of analog signals by means of a pulse code modulation, comprising a transmitter and a receiver, said transmitter comprising means to sample said analog signal at four times the maximum information frequency to be transmitted of said analog signal, a coder coupled to said sampling means to convert linearly said sampled signals to code groups comprising serial bits, a digital filter coupled to said coder, said digital filter being formed as a low pass, half band filter of the non-recursive type, and a digital compressor coupled to said digital filter, said receiver comprising a digital expander having an output which is similar to the input to said digital compressor, a digital filtering device for interpolating between code groups at the input means thereof to produce output code groups at at least four times the frequency of the input code groups thereof, said digital filtering device comprising a plurality of non-recursive filters, and a decoder being coupled to said digital filtering device for generating an output signal which is a reproduction of said analog signal.

2. A transmitter for the transmission of analog signals by means of a pulse code modulation, comprising means to sample said analog signal at least four times the maximum information frequency of said analog signal, a coder coupled to said sampling means to convert linearly said sampled signals to code groups comprising serial bits, a digital filter coupled to said coder being formed as a low pass, half band filter of the non-recursive type, and a digital compressor coupled to said digital filter.

3. A transmitter as claimed in claim 2, wherein said coder comprises a four-slope coder in which said sampled signal is applied to a duration modulator comprising two integrating networks having greatly differing time constants for pulse duration in accordance with four difference slopes, the three slopes of which commences at a fixed instant during each conversion period, means to derive 12-bit code groups coupled to said integrating networks, said duration modulator comprising two digital counters coupled to said integrating networks respectively, said digital counters being active one after the other during a half a conversion period and are thereafter converted into a shift register in order to supply the bits of a code group stored therein in parallel as a serial bit output signal.

4. A transmitter as claimed in claim 3, wherein the zero point of said conversion is located in the center of its linear region, said region corresponding to 64 times the bit of the smallest weight.

5. A transmitter as claimed in claim 2, wherein said digital filter comprises means to separate code groups into code groups of even order and code groups of odd order, a multiplier in which the code groups of even order are multiplied by a predetermined weight coefficient the magnitude of which is determined from the central transfer co-efficient of said digital filter, a plurality of multipliers in which code groups of odd order are multiplied by predetermined weight coefficients whose magnitudes are determined from the odd transfer co-efficients of said digital filter, and a cascade circuit of dynamic memories and combination devices for combining the output signals of said multipliers in a predetermined manner.

6. A receiver for a pulse code modulated signal comprising an analog signal encoded as compressed digitally code groups, said receiver comprising a digital expander, a digital filter device for interpolating between code groups at the input means thereof to produce output code groups at least four times the frequency of the input code groups thereof, said digital filtering device comprising non-recursive filters and a decoder, said decoder being coupled to said digital device for generating an output signal which is a reproduction of said analog signal.

7. A receiver as claimed in claim 6, further comprising means to convert the pulse code modulation signal from said digital filtering device into delta pulse code modulation by subtracting successive code groups from each other, said conversion means being between said digital filtering device and said decoder.

8. A receiver as claimed in claim 7, wherein said digital filtering device comprises a cascade circuit of two devices each of said devices comprising a non-recursive digital filter, a delay circuit connected to the input means of said digital filter and an OR-gate connected to the output means of said digital filter, the output means of said delay circuit being connected to said OR-gate whereby code groups present at the output means of said digital filter and code groups present at the output means of said delay circuit alternate with each other.

9. A receiver as claimed in claim 8, wherein said non-recursive digital filter comprises a plurality of multipliers in which code groups at the filter input are multiplied by predetermined weight co-efficients whose magnitudes are determined from the odd transfer co-efficients of said digital filter, and a cascade circuit of dynamic memories and combination device for combining the output signal of said multipliers in a predetermined manner.

10. A receiver as claimed in claim 7, wherein said decoder comprises a device which converts 12-bits code groups applied to the input into two independent density-modulation pulse trains, namely one pulse train for six bits of small weight and one integrator employing two time constants which are fed in the same time by the two said pulse trains and the output of which supplied the original analog signal.

* * * * *

UNITED STATES PATENT OFFICE

CERTIFICATE OF CORRECTION

Patent No. 3,904,963 Dated September 9, 1975

Inventor(s) Maurice Georges Bellanger et al.

It is certified that error appears in the above-identified patent and that said Letters Patent are hereby corrected as shown below:

Col. 4, line 6, "smaller" should be --smallest--;

Col. 6, line 30, should read:

$$-- \phi_E = A_o S_o + \sum_{n=1}^{\infty} A_n (S_n + S_{-n}) --;$$

Col. 8, line 44, "the" should be --two--;

Col. 8, line 54, after "gate" should be --18--;

Signed and Sealed this

*sixth* Day of *January 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,904,963

DATED : September 9, 1975

INVENTOR(S) : MAURICE GEORGES BELLANGER and JACQUES LUCIEN DAGUET

It is certified that error appears in the above-identified patent and that said Letters Patent are hereby corrected as shown below:

ON THE TITLE PAGE

Insert the following where appropriate:

--[30] FOREIGN APPLICATION PRIORITY DATA

August 6, 1969 French..................6926970--;

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*